US007142578B2

(12) United States Patent
Meehan et al.

(10) Patent No.: US 7,142,578 B2
(45) Date of Patent: Nov. 28, 2006

(54) SINGLE BEAMFORMING STRUCTURE FOR MULTIPLE MODULATION SCHEMES

(75) Inventors: Joseph Patrick Meehan, Dublin (IE); Xuemei Ouyang, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 887 days.

(21) Appl. No.: 10/150,827

(22) Filed: May 17, 2002

(65) Prior Publication Data

US 2003/0231699 A1 Dec. 18, 2003

(51) Int. Cl.
*H04B 1/69* (2006.01)

(52) U.S. Cl. ...................................................... 375/130

(58) Field of Classification Search ................ 375/130, 375/343, 267; 342/372, 154, 378

See application file for complete search history.

(56) References Cited

U.S. PATENT DOCUMENTS 5,579,016 A * 11/1996 Wolcott et al. ............. 342/378
5,764,187 A * 6/1998 Rudish et al. .............. 342/372
6,111,816 A * 8/2000 Chiang et al. ................. 367/7

OTHER PUBLICATIONS http://www.ihf.rwth-aachen.de/Deutsche Seiten/Forschung/Sdma/sdma.html:"Adaptive Antennen" Institut fuer Hochfrequenztechnik (IHF), p. 1-4.

* cited by examiner

*Primary Examiner*—Khai Tran

(57) ABSTRACT

A method for a beam forming configuration is provided. A representation of a 3D polygon is formed from a plurality of blocks. The blocks are arranged according to a frequency, a time, and a space within the 3D polygon. Based on the frequency, the time, and the space of an electronic signal, one of the blocks is selected. An equation that is based on the block or to the block and the blocks relationship to one or more of the other blocks is used to form an output.

31 Claims, 7 Drawing Sheets

SINGLE BEAMFORMING STRUCTURE FOR MULTIPLE MODULATION SCHEMES

BACKGROUND

There are a multitude of wireless networks that are designed for specific applications. In order to facilitate communication among components of the networks, standards are used for the different types of networks. For example, UMTS (Universal Mobile Telecommunications System) is used for cellular networks, Bluetooth is used for PAN (Personal Area Network), and 802.11 is used for WLAN (Wireless Local Area Network). Generally, the standards specify different modulation schemes.

However, when a large amount of users are on the wireless network, receivers of the network are in close proximity, or the frequency spectrum is congested, interference can occur. To reduce the amount of interference, a technique known as beam forming may be used. Beam forming is a receiver based technique designed to reduce the amount of interference and increase bandwidth efficiency based on space separation.

In prior art system, a beam former algorithm is used to perform the beam forming. A different beam forming algorithm is used for different modulation schemes. For example, a plurality of beam forming algorithms exist for both CDMA (Code Division Multiple Access) and for Single-carrier TDMA (Time Division Multiple Access). This results in substantial overhead in coding and hardware for networks that utilize more than one modulation scheme.

SUMMARY OF THE INVENTION

In a first embodiment according to the present invention, a method for beam forming is provided. A representation of a 3D polygon is formed from a plurality of blocks. The blocks are arranged according to a frequency, a time, and a space within the 3D polygon. Based on the frequency, the time, and the space of an electronic signal, one of the blocks is selected. An equation that is based on the block or to the block and the blocks relationship to one or more of the other blocks is used to form an output.

In a second embodiment according to the present invention, a method for beam forming is provided. A representation of a 3D polygon is formed from a plurality of blocks. The blocks are arranged according to a frequency, a time, and a space within the 3D polygon. Based on the frequency, the time, and the space of an electronic signal, one of the blocks is selected. If the block does not references any other block, a result is formed by applying an equation based on the block to the electronic signal. If the block references any other blocks, the step of forming a result for each of the other blocks is repeated. An output based on the results obtained in the step of forming a result is then formed.

In a third embodiment according to the present invention, a method for beam forming is provided. In step (a) a representation of a 3D polygon is formed from a plurality of blocks. The blocks are arranged according to a frequency, a time, and a space within the 3D polygon. In step (b) based on the frequency, the time, and the space of an electronic signal, one of the blocks is selected. In step (c) if the block does not references any other block, a result is formed by applying an equation based on the block to the electronic signal. In step (d) if the block references any other blocks, steps (c) and (d) are repeated for each of the other blocks. In step (e) an output is formed based on the results obtained in step (c).

In a fourth embodiment according to the present invention, a method for beam forming is provided. A representation of a 3D polygon is provided from a plurality of blocks (Step A). The blocks are arranged according to a frequency, a time, and a space within the 3D polygon. Based on the frequency, time, and space of an electronic signal, one of the blocks is selected (Step B). A result is formed by applying an equation based on the block to the electronic signal (Step C). If the block references any other blocks, step (C) is repeated for each of the other blocks (Step D). An output is formed based on the results obtained in steps (C) and (D) (Step E).

In a fifth embodiment according to the present invention, a system for beam forming is provided. A receiver receives an electronic signal. A control device identifies a type of the received electronic signal. The type further comprises a frequency, a time, and a space. A beam former is configured to form a representation of a 3D polygon from a plurality of blocks, the blocks arranged within the 3D polygon based on the identified type; based on the identified type, select one of the blocks; and form an output, the output based on the block or on the block and the blocks relationship to one or more of the other blocks.

DETAILED DESCRIPTION OF THE PREFERRED EMBODIMENTS

In an embodiment according to the present invention, a beam former configuration that works with Single-carrier (SC), Spread-spectrum (SS), and Multi-carrier (MC) modulation schemes is disclosed. The beam former algorithm works for SC modulation in the time domain and space domain. However, for MC modulation, the beam former algorithm works in the space domain and frequency domain.

Preferably, the output format is changed depending on whether the communication system is Single-carrier or Multi-carrier.

Figure 1:
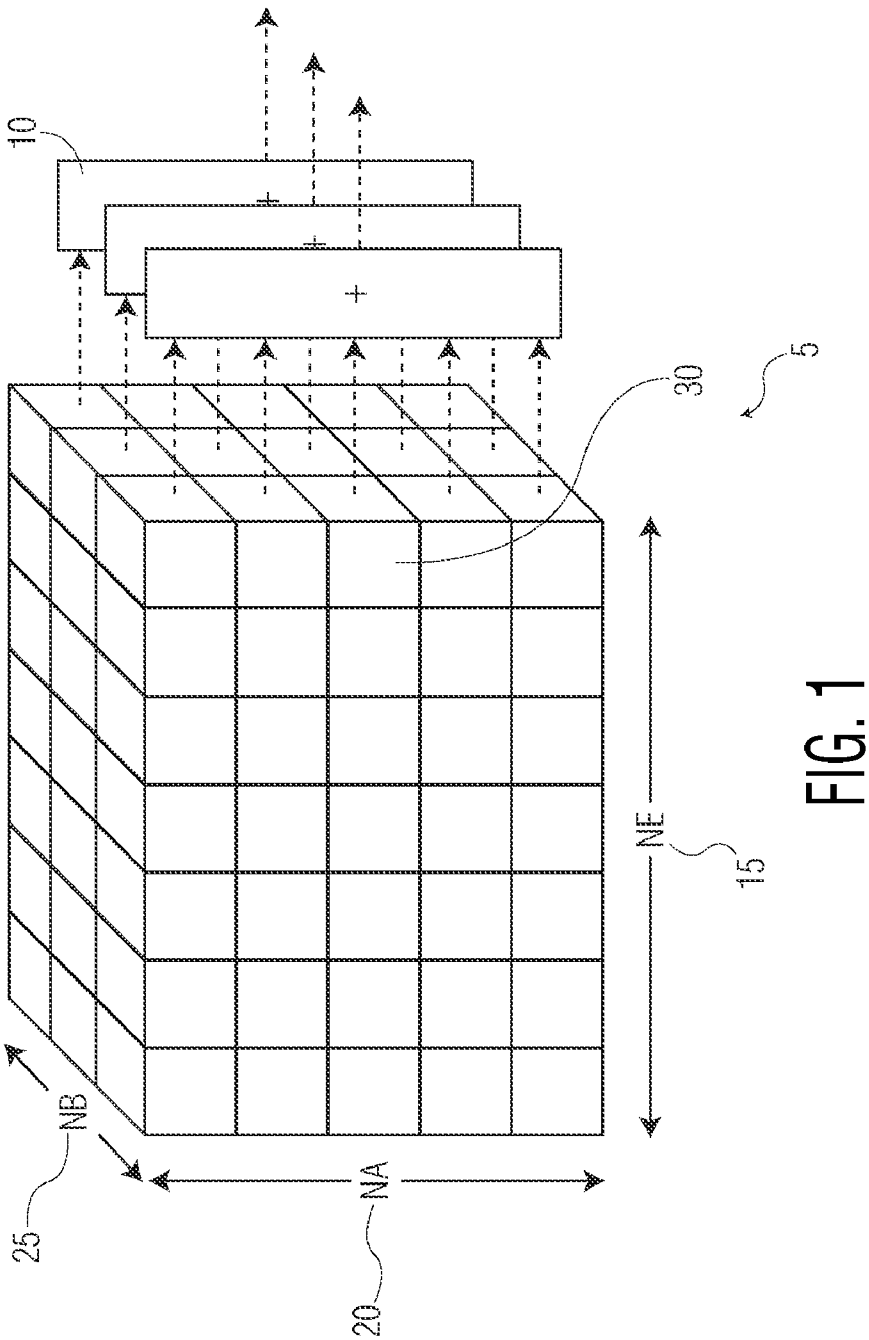
FIG. 1 shows a 3D schematic representation of a beam former algorithm.

FIG. 1 shows a 3D schematic representation of a beam former algorithm 5. The beam former algorithm 5 is represented as a 3D polygon (e.g., a 3D matrix). Input to the algorithm is on the left (not shown), and an output 10 is on the right. An x axis (NE) 15 represents the time domain of the algorithm, a y axis (NA) 20 represents the space domain, and a z (NB) axis 25 represents the frequency domain. Preferably, the x axis 15 also represents a plurality of equalizer taps, the y axis 20 also represents a plurality of antennae, and the z axis 25 also represents a plurality of coefficients, for example, an OFDM (orthogonical frequency division multiplexing) block. A plurality of blocks 30 are defined in relation to the x, y, and z axises 15,20,25. Each block 30 in the algorithm 5 represents a set of mathematical functions to be performed on the input. For example, the output 10 from the beam former algorithm 5 can be yn,m, where yn,m is defined as:

$$y_{n,m} = \sum_{p=0}^{NA-1} \sum_{i=0}^{NE-1} a_{n,p,i} x_{n,p,m-i} \ \forall n = 1 \ldots NB-1$$

where an,p,i are the 3D beam former coefficients for block position n, antenna p and time i, and xn,p,m is the input for block position n, antenna p and time m. Note that there are two time coefficients, i and m. One of the time coefficients is for exact time and one is for the delay line. In the block diagram, the coefficient n corresponds to the z axis 25 (frequency). The coefficient p corresponds to the x axis 20 (number of antenna). The coefficient m corresponds to the y axis 15 (time). The block position ranges over [0 . . . NB−1]. The adaptation algorithm, which is used in the above equation, can be a standard LMS (least means square) or RLS (recursive least square) algorithm such as $$a_{n,p,i}(m+1)=a_{n,p,i}(m)+\Delta e_m x_{n,p,i}(m)$$

where an,p,i(m) are the 3D beam former coefficients for frequency n, antenna p, and tap delay line tap i.

Figure 2:
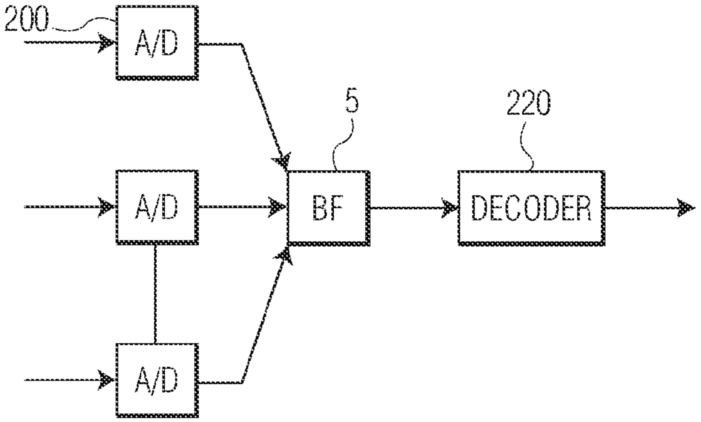
FIG. 2 shows a Single-carrier system utilizing the beam former algorithm.

FIG. 2 shows an SC system utilizing the beam former algorithm 5. A plurality of electronic signals enter a plurality of A/Ds (Analog to Digital Converters) 200 and are converted to digital data streams. Output from the A/Ds 200 are directed to the beam former algorithm 5. Preferably, the beam former algorithm 5 is configured as in FIG. 6. The output 10 from the beam former algorithm 5 is directed to a decoder 220. Output from the decoder 220 continues downstream to further algorithms or processing devices.

Figure 3:
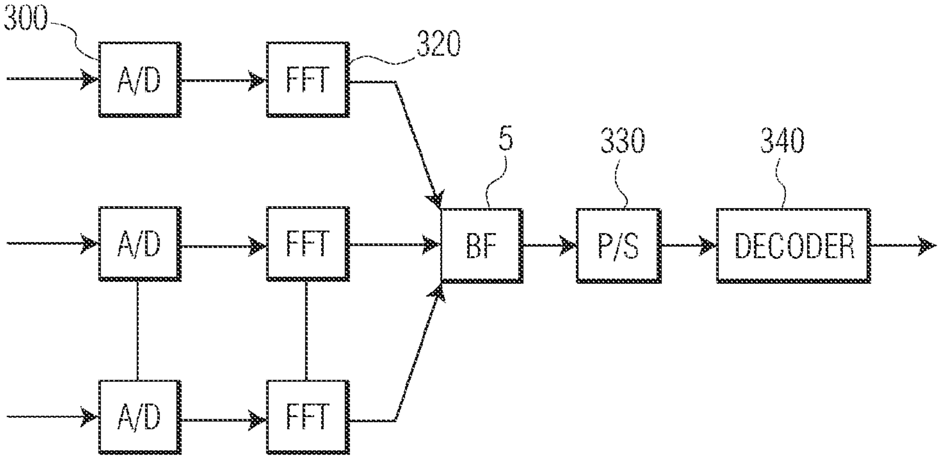
FIG. 3 shows a Multi-carrier system utilizing the beam former algorithm in a post-FFT position.
Figure 7:
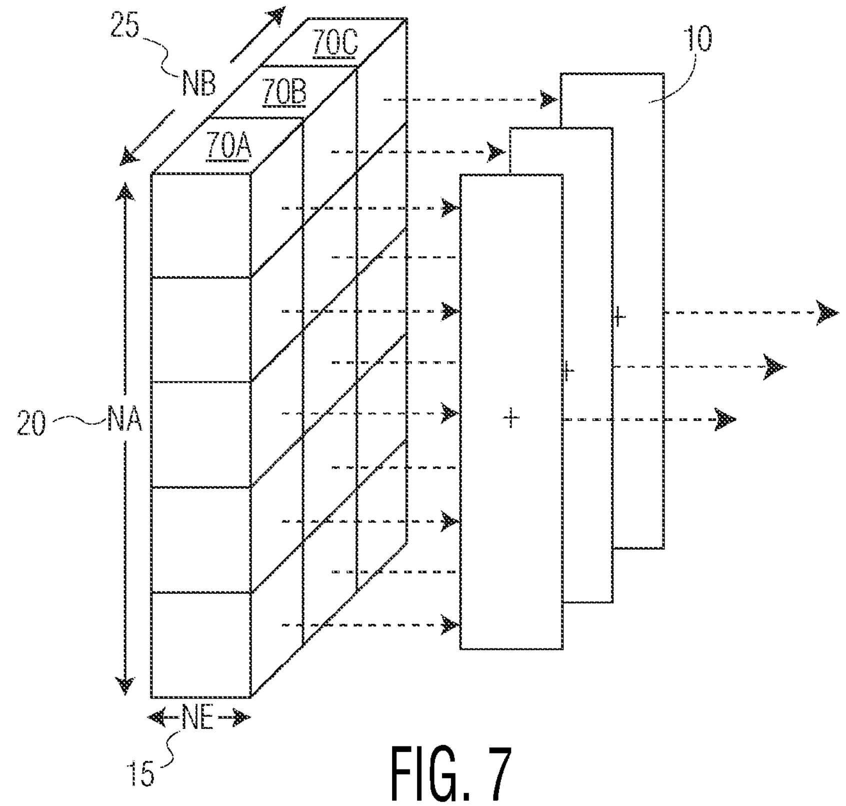

FIG. 3 shows an MC system utilizing the beam former algorithm 5 in post-FFT (Fast Fourier Transform) position. In other words, the beam former algorithm 5 is applied to the digital stream after it has been converted from the time domain to the frequency domain via the FFT transform. Preferably, the beam former algorithm 5 is configured as shown in FIG. 7 (e.g., the coefficient m=0). A plurality of digital signals enter a plurality of A/Ds 300. Output from the A/Ds 300 is sent to an FFT 320. Output from the FFT 320 proceeds to the beam former algorithm 5. The output 10 from the beam former algorithm 5 is directed to a P/S algorithm 330. From the P/S algorithm 330, output is sent to a decoder 340. Output from the decoder 340 continues downstream to further algorithms or processing devices.

Figure 4:
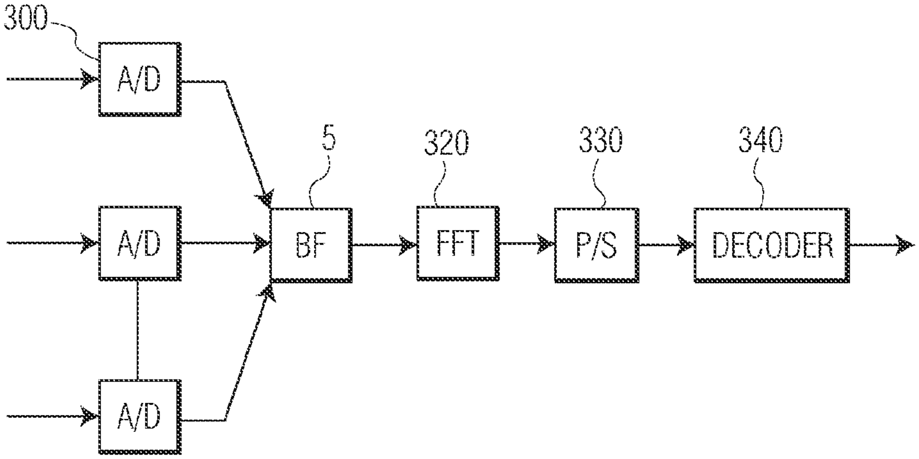
FIG. 4 shows a Multi-carrier system utilizing the beam former algorithm in a pre-FFT position.

FIG. 4 shows an MC system utilizing the beam former algorithm 5 in a pre-FFT position. In other words, the beam former algorithm 5 is applied to the digital signal while it is still in the time domain. Preferably, the beam former algorithm 5 is configured so that the x axis 15 is equal to the z axis 20. The MC system shown in FIG. 4 functions as the MC system shown in FIG. 3, except the beam former algorithm 5 is located before the FTTs 320. Thus, the output from the beam former algorithm 5 is directed to an FFT 320, and the output from the A/Ds 300 is directed to the beam former algorithm 5. Moreover, the beam former algorithm 5 as shown in FIG. 4 is configured to the time domain.

Figure 5:
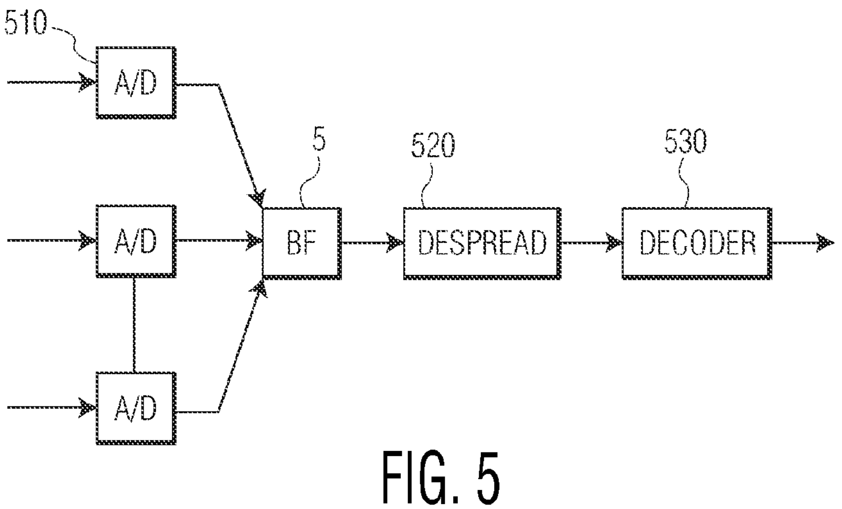
FIG. 5 shows a Spread-spectrum system utilizing the beam former algorithm.

FIG. 5 shows an SS system utilizing the beam former algorithm 5. A plurality of electronic signals enter a plurality of A/Ds 510 and is converted to a digital signal. Output from the A/Ds 510 is directed to the beam former algorithm 5. The output 10 from the beam former algorithm 5 is directed to a despread 520. The despread 520 sends its output to a decoder 530. Output from the decoder 530 continues downstream to further algorithms or processing devices. Preferably, the beam former algorithm 5 acts similarly to one or more chip equalizers, for example, at chip rate. Most preferably, the x axis 15 of the beam former 5 algorithm is configured to the chip rate.

Figure 6:
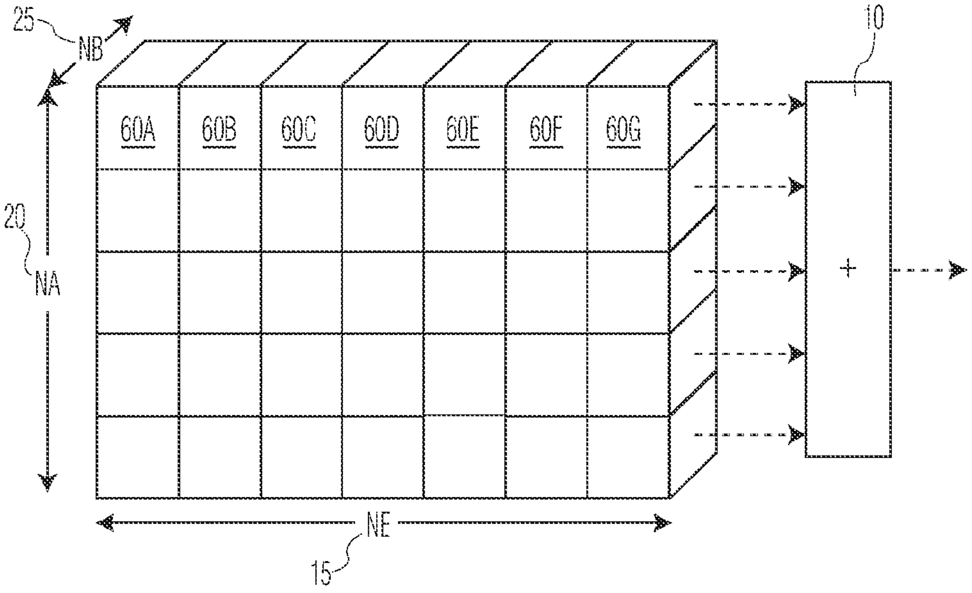
FIGS. 6 and 7 show embodiments wherein the beam former algorithm has been configured to utilize less memory resources.

FIGS. 6 and 7 show embodiments wherein the beam former algorithm 5 has been configured to utilize less memory resources. In particular, instead of using the entire beam former algorithm 5, only a portion of the beam former algorithm 5 is selected for receiving inputs and providing outputs, while the rest of the beam former algorithm 5 or different configurations thereof are used in different modes of operation. FIG. 6 shows the beam former algorithm 5 configured to 2-D mode for SC reception. In SC mode, the z axis 25 can be set to 1. The x and y axis 15,20 can then be set as normal. FIG. 6 shows an embodiment of the beam former algorithm 5 where the coefficient n=0 for general equation. FIG. 7 shows the beam former algorithm 5 configured to 2-D mode for MC reception. In MC mode, the x axis 15 can be set to 1, and the y and z axis 20,25 can be set as normal. FIG. 7 shows an embodiment of the beam former algorithm where the coefficient m=0. In an embodiment where the x axis 15 in SC mode is equal to the z axis 25 in MC mode, the beam former algorithm 5 can function in a 2D mode where one dimension is the number of antennae and the other dimension is either the frequency domain or time domain depending on the mode.

Figure 8:
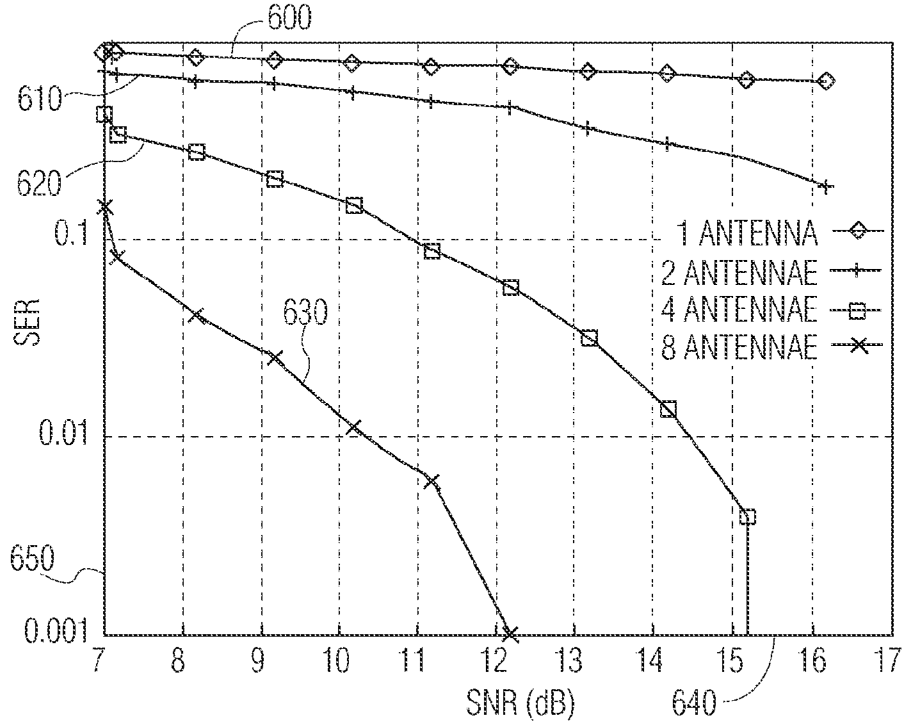
FIG. 8 shows the results of using the beam former algorithm for a Single-carrier system using 16 QAM and a bandwidth of 20 MHz over the frequency selective channel outlined in Table 1.
Figure 9:
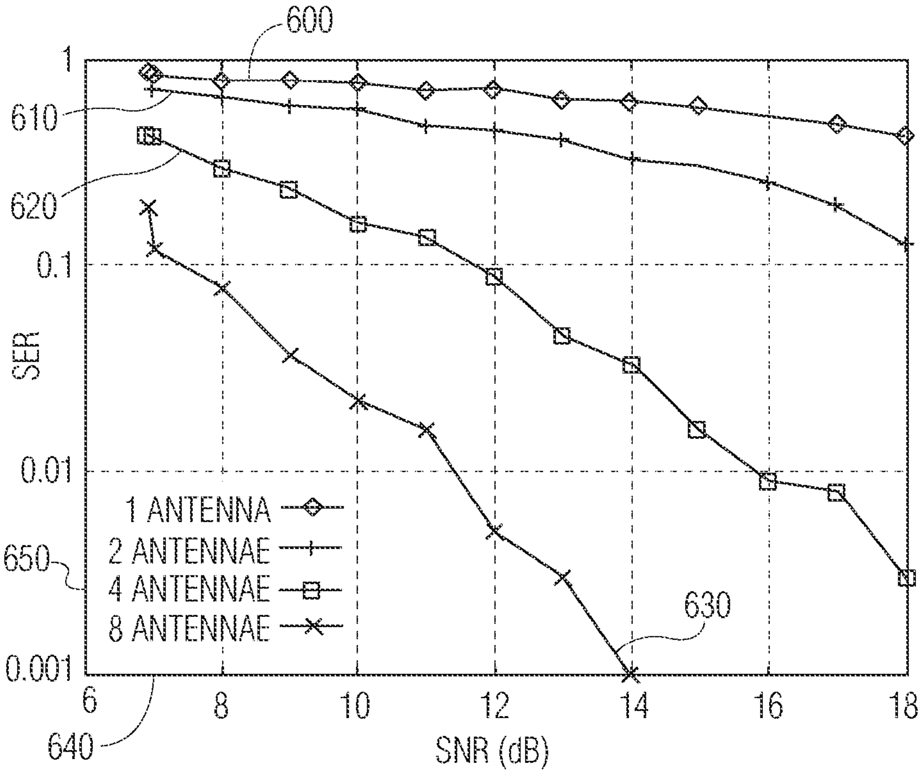
FIG. 9 shows the results of using the beam former algorithm for a Mult-carrier system using the same frequency selective channel of Table 1.

FIG. 8 shows the results of using the beam former algorithm 5 for an SC modulation scheme using 16 QAM and a bandwidth of 20 MHz over the frequency selective channel outlined in Table 1. FIG. 9 shows the results of using the beam former algorithm 5 for an MC system using the same frequency selective channel of Table 1. In FIGS. 8 and 9 a first line 600, a second line 610, a third line 620, and a fourth line 630 represent the results obtained with 1 antenna, 2 antennas, 4 antennas, and 8 antennas, respectively. An x axis represents 640 a SNR (Signal to Noise Ratio), and a y axis 650 represents a SER (Signal Error Rate). The channel used to obtain the results shown in FIGS. 8 and 9 is shown in Table 1. As can be seen from the results, as the number of antennae increases, the SNR performance improves.

TABLE 1

| Echo | 0 | 1 | 2 | 3 | 4 | 5 |
|---|---|---|---|---|---|---|
| Delay (ns) | 0 | 50 | 100 | 150 | 175 | 225 |
| Amplitude (dB) | 0.0 | −3.0 | 0.0 | −3.0 | 0.0 | −3.0 |
| DOA | [0-60] | [0-60] | [0-60] | [0-60] | [0-60] | [0-60] |

As can be seen from the channel characteristics, the echo spread is 225 ns and the echo amplitudes vary between 0 dB and −3 dB. The Direction of Arrival (DOA) of the echoes is random between 0 and 60.

In FIG. 9, the simulation was done with an OFDM system. The channel bandwidth was also 20 MHz and 16 QAM was used. A 64-point FFT was used and the guard interval was 0.8 s; this results in an OFDM symbol of length 4 s. These are the specifications of the OFDM modulation scheme used in the IEEE 802.11, a WLAN standard. For this simulation with the OFDM system, the beam former algorithm 5 was in the frequency domain.

Figure 10:
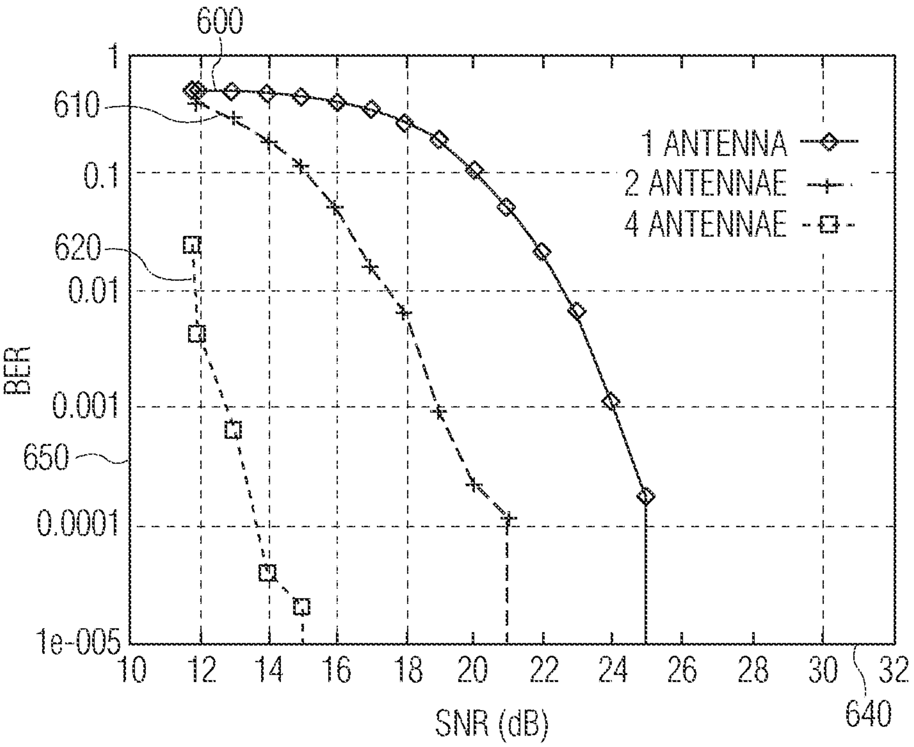
FIG. 10 shows the results of using the beam former algorithm with Spread-spectrum in a multipath and multiuser environment.
Figure 11:
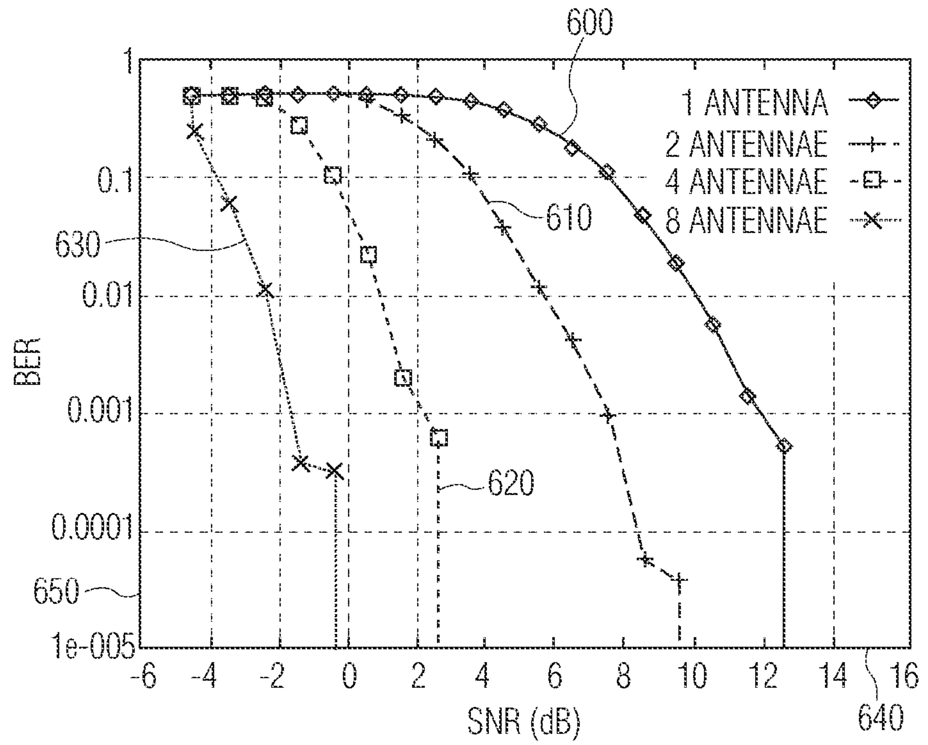
FIG. 11 shows the results of a simulation using the beam former algorithm with Spread-spectrum in a multipath and single user environment.

FIG. 10 shows the results of using the beam former algorithm 5 with Spread-spectrum in a multipath and multiuser environment. FIG. 11 shows the results of a simulation using the beam former algorithm 5 with Spread-spectrum in a multipath and single user environment. In FIGS. 10 and 11 a first line 600, a second line 610, a third line 620, and a fourth line 630 represent the results obtained with 1 antenna, 2 antennas, 4 antennas, and 8 antennas, respectively. The x axis represents a SNR range 640, and the y axis represents a SER range 650. The channel used to obtain the results shown in FIGS. 10 and 11 is shown in Table 2. In FIG. 10, the number of users is 3. As can be seen from both sets of results, the SNR performance improves as the number of antennae increases.

TABLE 2

| Echo | 0 | 1 | 2 | 3 | 4 | 5 |
|---|---|---|---|---|---|---|
| Delay (s) | 0 | 0.26 | 0.52 | 0.78 | 1.04 | 1.3 |
| Amplitude (dB) | 0 | −3.0 | −6.0 | −9 | −12 | −15.0 |
| DOA | [0-60] | [0-60] | [0-60] | [0-60] | [0-60] | [0-60] |

Figure 12:
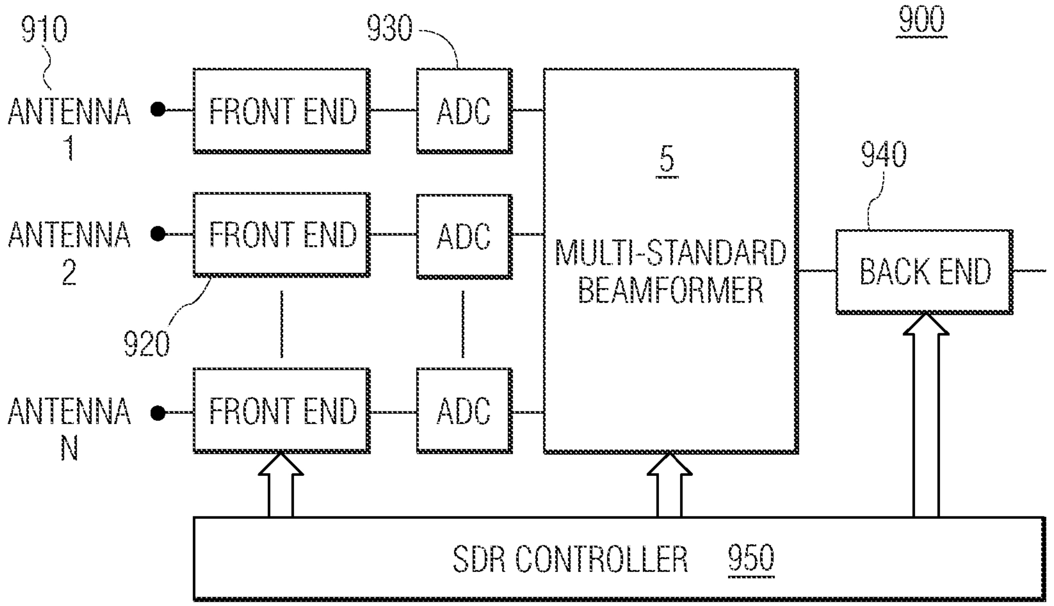
FIG. 12 shows a system diagram that incorporates the present invention.

FIG. 12 shows a system 900 that incoportes the present invention. The system 900 could be, for example, a wireless communication receiver. Incoming data is received at one or more antennas 910 and is passed through one or more front ends 920. The front ends 920 process the data and send the data to an ADC 930 (analog-digital converter). From the ADC 930, the data is passed to the beam former algorithm 5. The single output from the beam former algorithm 5 is passed to a back end 940. At the back end 940 error protection and/or coding can be added. An SDR (software defined radio) 950 can interface with the system 900. For example, the SDR 950 could be used as a controller. The SDR 950 can also be used to configure the beam former algorithm 5. For example, the SDR 950 can be used to configure the 3D structure of the beam former algorithm 5. Preferably, based on the modulation scheme, the SDR 950 can be used to set the front end 920 (e.g., synchronization), and the back end 940 (e.g., error correction decoding).

Figure 13:
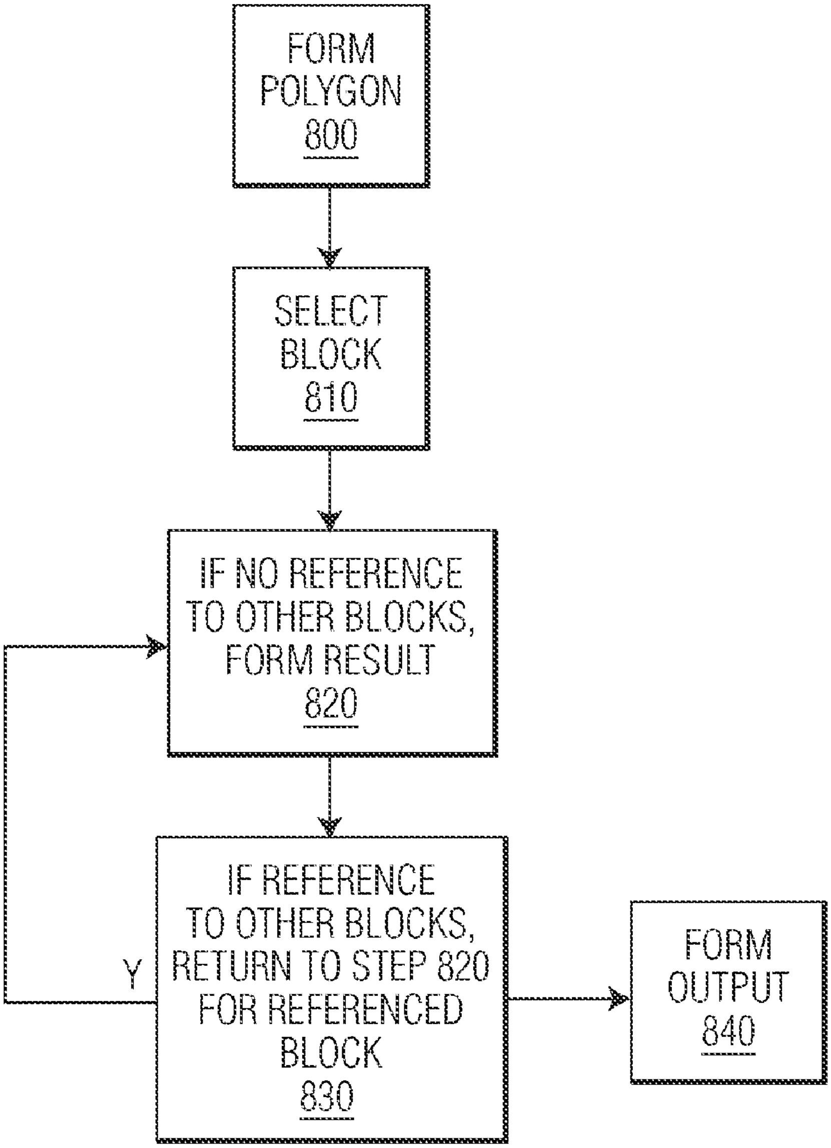
FIG. 13 shows a flow chart of the beam former algorithm.

FIG. 13 shows a flow chart of the beam former algorithm 5. The method forms a representation of a 3D polygon in a computer memory from a plurality of blocks, the blocks arranged according to a frequency, a time, and a space within the 3D polygon 800. Preferably, the form of the 3D polygon is sent via the SDR controller. For example, if frequency domain beam forming is required, the 3D polygon is configured as in FIG. 7. However, if time domain beam forming is required, the 3D polygon is configured as in FIG. 6. Based on the frequency, the time, and the space of an electronic signal, one of the blocks is selected (Step 810). If the block does not references any other block (such as blocks 70A–70C in FIG. 7), a result is formed by applying an equation based on the block to the electronic signal (Step 820). If the block references any other blocks (such as blocks 60A–60F in FIG. 6), the method returns to Step 820 for the block that is referenced (Step 830). An output based on the results obtained in step(s) 820 is then formed (Step 840).

Preferably, the output format is changed depending on whether the modulation system is SC, SS, or MC. For example, in MC the output can in block format, and in SC the output can be in symbol stream format. In certain embodiments, the beam former algorithm 5 is configured for one or more network standards.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for beam forming, comprising the steps of: forming a representation of a 3D polygon from a plurality of blocks, the blocks arranged according to a frequency, a time, and a space within the 3D polygon; based on the frequency, the time, and the space of an electronic signal, selecting one of the blocks; and forming an enhanced output, by processing the electronic signal based on the block or on the block and the blocks relationship to one or more of the other blocks.

2. The method as recited in claim 1 wherein the frequency, time, or space has value of 1.

3. The method as recited in claim 1 wherein the electronic signal is digital.

4. The method as recited in claim 1 wherein the electronic signal is analog.

5. The method as recited in claim 1 further comprising the steps of receiving the electronic signal from a first unit in a single-carrier system; and sending the output to a second unit in the single carrier system.

6. The method as recited in claim 1 further comprising the steps of receiving the electronic signal from a first unit in a multi-carrier system; and sending the output to a second unit in the multi-carrier system.

7. The method as recited in claim 1 further comprising the steps of receiving the electronic signal from a first unit in a spread spectrum system; and sending the output to a second unit in the spread spectrum system.

8. A method for beam forming, comprising the steps of: forming a representation of a 3D polygon from a plurality of blocks, the blocks arranged according to a frequency, a time, and a space within the 3D polygon; based on the frequency, the time, and the space of an electronic signal, selecting one of the blocks; if the block does not references any other block, forming a result by applying an equation based on the block to the electronic signal; if the block references any other blocks, repeating the step of forming a result for each of the other blocks; and forming an enhanced output signal based on the results obtained in the step of forming a result.

9. The method as recited in claim 8 wherein the frequency, time, or space has value of 1.

10. The method as recited in claim 8 wherein the electronic signal is digital.

11. The method as recited in claim 8 wherein the electronic signal is analog.

12. The method as recited in claim 8 further comprising the steps of receiving the electronic signal from a first unit in a single carrier system; and sending the output to a second unit in the single carrier system.

13. The method as recited in claim 8 further comprising the steps of receiving the electronic signal from a first unit in a multi-carrier system; and sending the output to a second unit in the multi-carrier system.

14. The method as recited in claim 8 further comprising the steps of receiving the electronic signal from a first unit in a spread spectrum system; and sending the output to a second unit in the spread spectrum system.

15. The method as recited in claim 8 wherein the output is defined by $$y_{n,m} = \sum_{p=0}^{NA-1} \sum_{i=0}^{NE-1} a_{n,p,i} x_{n,p,m-i} \quad \forall n = 1 \ldots NB-1; \text{ and wherein}$$

$$a_{n,p,i}(m+1) = a_{n,p,i}(m) + \Delta e_m x_{n,p,i}(m).$$

16. The method as recited in claim 8 wherein the output is defined by $$y_{n,m} = \sum_{p=0}^{NA-1} \sum_{i=0}^{NE-1} a_{n,p,i} x_{n,p,m-i} \quad \forall n = 1 \ldots NB-1; \text{ and wherein}$$

$$a_{n,p,i}(m+1) = a_{n,p,i}(m) + \Delta e_m x_{n,p,i}(m).$$

17. The method as recited in claim 8 wherein the output is defined by $$y_{n,m} = \sum_{p=0}^{NA-1} \sum_{i=0}^{NE-1} a_{n,p,i} x_{n,p,m-i} \quad \forall n = 1 \ldots NB-1; \text{ and wherein}$$

$$a_{n,p,i}(m+1) = a_{n,p,i}(m) + \Delta e_m x_{n,p,i}(m).$$

18. A method for beam forming, comprising the steps of: (A) forming a representation of a 3D polygon from a plurality of blocks, the blocks arranged according to a frequency, a time, and a space within the 3D polygon; (B) based on the frequency, the time, and the space of an electronic signal, selecting one of the blocks; and (C) forming a result by applying an equation based on the block to the electronic signal; (D) if the block references any other blocks, repeating step (C) for each of the other blocks; and (E) forming an enhanced output signal based on the results obtained in steps (C) and (D).

19. The method as recited in claim 18 wherein the frequency, time, or space has value of 1.

20. The method as recited in claim 18 wherein the electronic signal is digital.

21. The method as recited in claim 18 wherein the electronic signal is analog.

22. The method as recited in claim 18 further comprising the steps of receiving the electronic signal from a first unit in a single carrier system; and sending the output to a second unit in the single carrier system.

23. The method as recited in claim 18 further comprising the steps of receiving the electronic signal from a first unit in a multi-carrier system; and sending the output to a second unit in the multi-carrier system.

24. The method as recited in claim 18 further comprising the steps of receiving the electronic signal from a first unit in a spread spectrum system; and sending the output to a second unit in the spread spectrum system.

25. A method for beam forming, comprising the steps of: (a) forming a representation of a 3D polygon from a plurality of blocks, the blocks arranged according to a frequency, a time, and a space within the 3D polygon; (b) based on the frequency, the time, and the space of an electronic signal, selecting one of the blocks; and (c) if the block does not references any other block, forming a result by applying an equation based on the block to the electronic signal; (d) if the block references any other blocks, repeating steps (c) and (d) for each of the other blocks; and (e) forming an output based on the results obtained in step (c).

26. A system for beam forming comprising: a receiver for receiving an electronic signal; a control device for identifying a type of the received electronic signal, the type further comprising a frequency, a time, and a space; and a beam former, the beam former configured to: form a representation of a 3D polygon from a plurality of blocks, the blocks arranged within the 3D polygon based on the identified type; based on the identified type, select one of the blocks; and form an output, the output based on the block or on the block and the blocks relationship to one or more of the other blocks.

27. The system as recited in claim 26 further wherein the receiver further comprises one or more antennas.

28. The system as recited in claim 26 wherein the type is selected from the group consisting of: SC, SS, and MC modulation schemes.

29. A computer-readable medium, having stored thereon, computer executable process steps operative to control a computer to document source files, the steps comprising: forming a representation of a 3D polygon from a plurality of blocks, the blocks arranged according to a frequency, a time, and a space within the 3D polygon; based on the frequency, the time, and the space of an electronic signal, selecting one of the blocks; and forming an output, the output based on the block or on the block and the blocks relationship to one or more of the other blocks.

30. A computer-readable medium, having stored thereon, computer executable process steps operative to control a computer to document source files, the steps comprising: forming a representation of a 3D polygon from a plurality of blocks, the blocks arranged according to a frequency, a time, and a space within the 3D polygon; based on the frequency, the time, and the space of an electronic signal, selecting one of the blocks; if the block does not references any other block, forming a result by applying an equation based on the block to the electronic signal; if the block references any other blocks, repeating the step of forming a result for each of the other blocks; and forming an output based on the results obtained in the step of forming a result.

31. A computer-readable medium, having stored thereon, computer executable process steps operative to control a computer to document source files, the steps comprising: (A) forming a representation of a 3D polygon from a plurality of blocks, the blocks arranged according to a frequency, a time, and a space within the 3D polygon; (B) based on the frequency, the time, and the space of an electronic signal, selecting one of the blocks; and (C) forming a result by applying an equation based on the block to the electronic signal; (D) if the block references any other blocks, repeating step (C) for each of the other blocks; and (E) forming an output based on the results obtained in steps (C) and (D).

* * * * *